United States Patent
Iemura et al.

(10) Patent No.: US 10,558,002 B2
(45) Date of Patent: Feb. 11, 2020

(54) OPTICAL RECEIVER MODULE, OPTICAL MODULE, AND OPTICAL TRANSMISSION EQUIPMENT

(71) Applicant: Lumentum Japan, Inc., Kanagawa (JP)

(72) Inventors: Koki Iemura, Kanagawa (JP); Michihide Sasada, Kanagawa (JP)

(73) Assignee: Lumentum Japan, Inc., Kanagawa (JP)

( * ) Notice: Subject to any disclaimer, the term of this patent is extended or adjusted under 35 U.S.C. 154(b) by 0 days.

(21) Appl. No.: 16/365,715

(22) Filed: Mar. 27, 2019

(65) Prior Publication Data

US 2019/0302381 A1    Oct. 3, 2019

(30) Foreign Application Priority Data

Mar. 30, 2018 (JP) ................................. 2018-067458

(51) Int. Cl.
*G02B 6/12* (2006.01)
*G02B 6/42* (2006.01)

(52) U.S. Cl.
CPC ......... *G02B 6/4206* (2013.01); *G02B 6/4214* (2013.01); *G02B 6/4284* (2013.01)

(58) Field of Classification Search
CPC ...... H01L 2924/00; H01L 2224/16225; G02B 6/12; G02B 6/4214
See application file for complete search history.

(56) References Cited

U.S. PATENT DOCUMENTS

| 6,071,016 A * | 6/2000 | Ichino .................. G02B 6/4204 385/92 |
| 6,684,032 B1 * | 1/2004 | Umeda ................ H04B 10/695 257/80 |
| 2009/0169219 A1 * | 7/2009 | Nakano .................... G02B 6/43 398/200 |
| 2013/0170791 A1 | 7/2013 | Kasahara et al. |

FOREIGN PATENT DOCUMENTS

| JP | 2012-058409 A | 3/2012 |
| JP | 2015-031818 A | 2/2015 |

* cited by examiner

*Primary Examiner* — Jennifer Doan
(74) *Attorney, Agent, or Firm* — Harrity & Harrity, LLP (57) ABSTRACT

There are provided an optical receiver module with an improvement in high frequency characteristic and reduction in size. The optical receiver module includes a substrate, an IC provided with two or more IC terminals, a light receiving element disposed in front of the IC, provided with two or more PD terminals and having a light receiving window, and a first optical component disposed in front of the IC provided with two bridge footing sections, and a lens main body section located between upper portions of the two bridge footing sections, the lens main body section is provided with a lens and a mirror, and a distance L1 between a position A of the lens and a position B of the light receiving window is longer than a distance L2 between the position B and a position C of an end part of the two bridge footing sections.

4 Claims, 8 Drawing Sheets

OPTICAL RECEIVER MODULE, OPTICAL MODULE, AND OPTICAL TRANSMISSION EQUIPMENT

CROSS-REFERENCE TO RELATED APPLICATION

The present application claims priority from Japanese application JP2018-67458 filed on Mar. 30, 2018, the content of which is hereby incorporated by reference into this application.

BACKGROUND OF THE INVENTION

1. Field of the Invention

The present invention relates to an optical receiver module, an optical module, and an optical transmission equipment, and in particular relates to a technology for improving the high frequency characteristic.

2. Description of the Related Art

It is common for an optical receiver module to be provided with a light receiving element and a lens, wherein the lens collects or collimates an optical signal entering the lens from an optical fiber to make the optical signal enter the light receiving element. In JP 2015-31818 A, there is disclosed an optical receiver module having a structure in which an optical signal entering a mirror from an optical fiber is changed in proceeding direction by the mirror.

Further, it is common for the optical receiver module to further be provided with an integrated circuit (IC) having an amplification function represented by a transimpedance amplifier (hereinafter described as TIA). The IC is electrically connected to the light receiving element. The light receiving element converts the optical signal received into an electric signal, wherein the IC amplifies the electric signal. In JP 2012-58409 A, there is disclosed an optical receiver module having a structure in which an IC with the TIA function is disposed on the same substrate as a light receiving element.

The optical receiver module described in JP 2015-31818 A has a complicated structure having two lens surfaces. Here, the first lens surface collimates the light from the optical fiber, the mirror reflects the light to change the proceeding direction, and the second lens surface collects the light to make the light reach the light receiving element. In such a complicated structure, it is difficult to realize reduction in size of the optical receiver module.

If the reduction in size of optical components including a lens and a mirror cannot be realized, the length of an interconnection for connecting the IC with the amplification function and the light receiving element cannot be shortened, an increase in the inductance is incurred, and thus, the high frequency characteristic is affected.

SUMMARY OF THE INVENTION

The present invention is made in view of such a problem, and has an object of providing an optical receiver module, an optical module, and an optical transmission equipment each capable of achieving both of an improvement in high frequency characteristic and reduction in size.

(1) In order to solve the above technical problems, the optical receiver module according to the present invention includes a substrate, an IC disposed on a surface of the substrate, provided with two or more IC terminals disposed along an end part, and having an amplification function, a light receiving element disposed on the surface of the substrate and in front of the IC, provided with two or more PD terminals respectively connected to the two or more IC terminals through two or more wires, and having a light receiving window through which light externally enters the light receiving element, and a first optical component disposed on the surface of the substrate and in front of the IC so as to cover the light receiving element, and provided with two bridge footing sections rising upward from the surface of the substrate, and a lens main body section supported by the two bridge footing sections, and located between upper portions of the two bridge footing sections, the lens main body section has a rising surface disposed in front, and is provided with a lens disposed on the rising surface and adapted to converge light entering the lens, and a mirror adapted to reflect the light converged by the lens to converge the light on the light receiving window of the light receiving element, and a distance L1 between a position A of the lens with respect to an end part of the IC and a position B of the light receiving window of the light receiving element is longer than a distance L2 between the position B with respect to the end part of the IC and a position C of an end part on the IC side of the two bridge footing sections of the first optical component in a planar view.

(2) In the optical receiver module according to (1) described above claim 1, a ratio of the distance L2 to the distance L1 may be no lower than 0.07 and lower than 1.0.

(3) The optical module according to the present invention may include the optical receiver module according to one of (1) and (2) described above, and an optical transmitter module.

(4) The optical transmission equipment according to the present invention includes the optical module according to (3) described above.

According to the present invention, there are provided an optical receiver module, an optical module and an optical transmission equipment in which an improvement in high frequency characteristic and reduction in size are both satisfied.

DETAILED DESCRIPTION OF THE INVENTION

Hereinafter, embodiments of the present invention will be described specifically and in detail with reference to the drawings. In all the drawings for describing the embodiments, the same reference numerals are given to the members having the same function, and the repeated description thereof will be omitted. The drawings illustrated below merely illustrate examples of the embodiments, and the sizes of the drawings and the scales described in the embodiments do not necessarily coincide with each other.

First Embodiment

Figure 1:
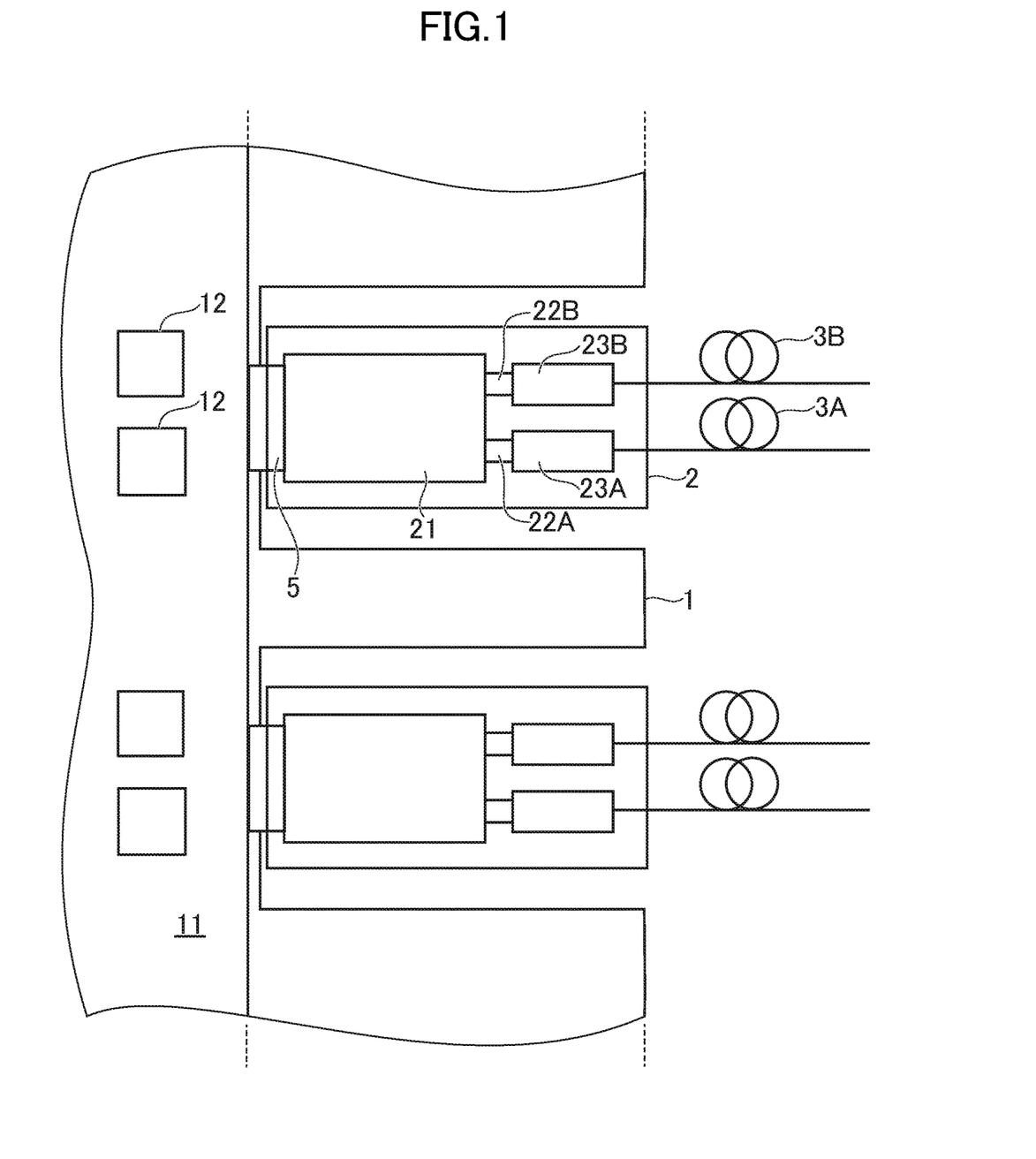
FIG. 1 is a schematic view illustrating a configuration of an optical transmission equipment and an optical module according to a first embodiment of the present invention.

FIG. 1 is a schematic view illustrating a configuration of an optical transmission equipment 1 and an optical module 2 according to a first embodiment of the present invention. The optical transmission equipment 1 includes a printed circuit board 11 (PCB) and an IC 12. The optical transmission equipment 1 is, for example, a large-capacity router or a switch. The optical transmission equipment 1 has, for example, a function of a switching equipment, and is disposed in a base station or the like. A plurality of optical modules 2 is mounted in the optical transmission equipment 1. The optical transmission equipment 1 acquires data for receiving (electric signal for receiving) from the optical module 2, determines to transmit what data to where using the IC 12 or the like, generates data for transmitting (electric signal for transmitting), and transmits the data to the corresponding optical module 2 through the printed circuit board 11.

The optical module 2 is a transceiver having a function of optical transmitting and a function of optical receiving. The optical module 2 includes a printed circuit board 21, an optical receiver module 23A which converts an optical signal received through an optical fiber 3A into an electric signal, and an optical transmitter module 23B which converts an electric signal into an optical signal and transmits the optical signal to an optical fiber 3B. The printed circuit board 21 is connected to the optical receiver module 23A and the optical transmitter module 23B through flexible printed circuits 22A and 22B (FPC), respectively. An electric signal is transmitted from the optical receiver module 23A to the printed circuit board 21 through the flexible printed circuit 22A, and an electric signal is transmitted from the printed circuit board 21 to the optical transmitter module 23B through the flexible printed circuit 22B. The optical modules 2 and the optical transmission equipment 1 are connected to each other through electrical connectors 5. The optical receiver module 23A and the optical transmitter module 23B are electrically connected to the printed circuit board 21 and convert an optical/electric signal into an electric/optical signal. The printed circuit board 21 includes a control circuit (for example, an IC) to control the electric signal transmitted from the optical receiver module 23A, and a control circuit (for example, an IC) to control the electric signal transmitted to the optical transmitter module 23B.

A transmission system according to the first embodiment includes two or more of the optical transmission equipments 1, two or more of the optical modules 2, and one or more of optical fibers 3 (not shown in FIG. 1: for example, the optical fibers 3A and 3B). One or more of the optical modules 2 are connected to each optical transmission equipment 1. The optical fiber 3 is connected between the optical modules 2 mounted on the two optical transmission equipments 1, respectively. Transmitting data generated by one of the two optical transmission equipments 1 is converted into an optical signal by the mounted optical module 2, and such an optical signal is transmitted to the optical fiber 3. The optical signal transmitted over the optical fiber 3 is received by the optical module 2 mounted on the other of the two optical transmission equipments 1, and the optical module 2 converts the optical signal into an electric signal and transmits the electric signal to the other of the two optical transmission equipments 1 as receiving data.

Figure 2:
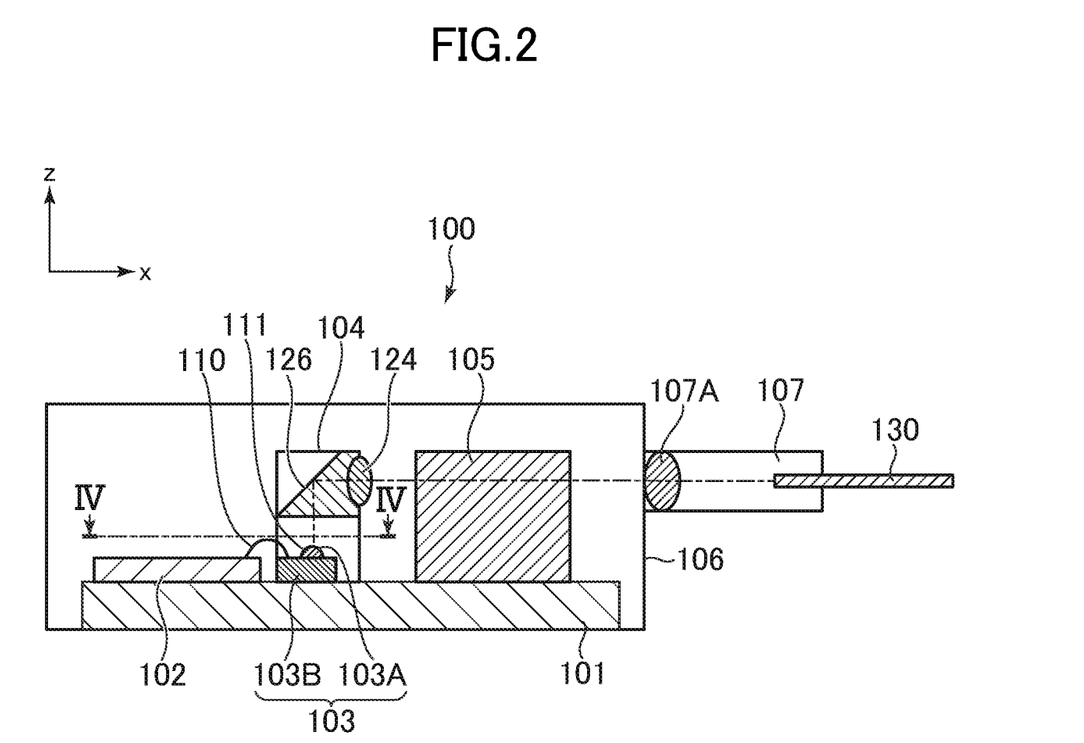
FIG. 2 is a schematic view illustrating a structure of an optical receiver module according to the first embodiment of the present invention.

FIG. 2 is a schematic view illustrating the structure of an optical receiver module 100 according to the first embodiment. The optical receiver module 100 according to the first embodiment corresponds to the optical receiver module 23A illustrated in FIG. 1. The optical receiver module 100 is in the 100 Gbit/s class, and is a four-channel (each channel is in the 25 Gbit/s class) ROSA (Receiver Optical SubAssembly). The optical receiver module 100 is provided with a metal substrate 101 (a support substrate), an IC 102 with an amplifier function, a PD element 103 (Photo Detector), a microlens array 104, an optical demultiplexing circuit 105, a box-type housing 106, and a connecting section 107 including a collimating lens 107A. The metal substrate 101 is disposed on an inner bottom surface of the box-type housing 106. On a surface of the metal substrate 101, there are disposed the IC 102, the PD element 103, the microlens array 104 and the optical demultiplexing circuit 105. The connecting section 107 is disposed on a side surface of the box-type housing 106. In the optical receiver module 100 according to the first embodiment, the substrate (a support substrate) is not limited to the metal substrate 101, but can also be a substrate formed of another material. FIG. 2 illustrates a cross-section by an x-z plane of the optical receiver module 100. Here, an x-axis direction is parallel to a direction (a −x-axis direction) of an incident light from the connecting section 107, and a z-axis direction is a direction perpendicular to the surface of the metal substrate 101.

Figure 4:
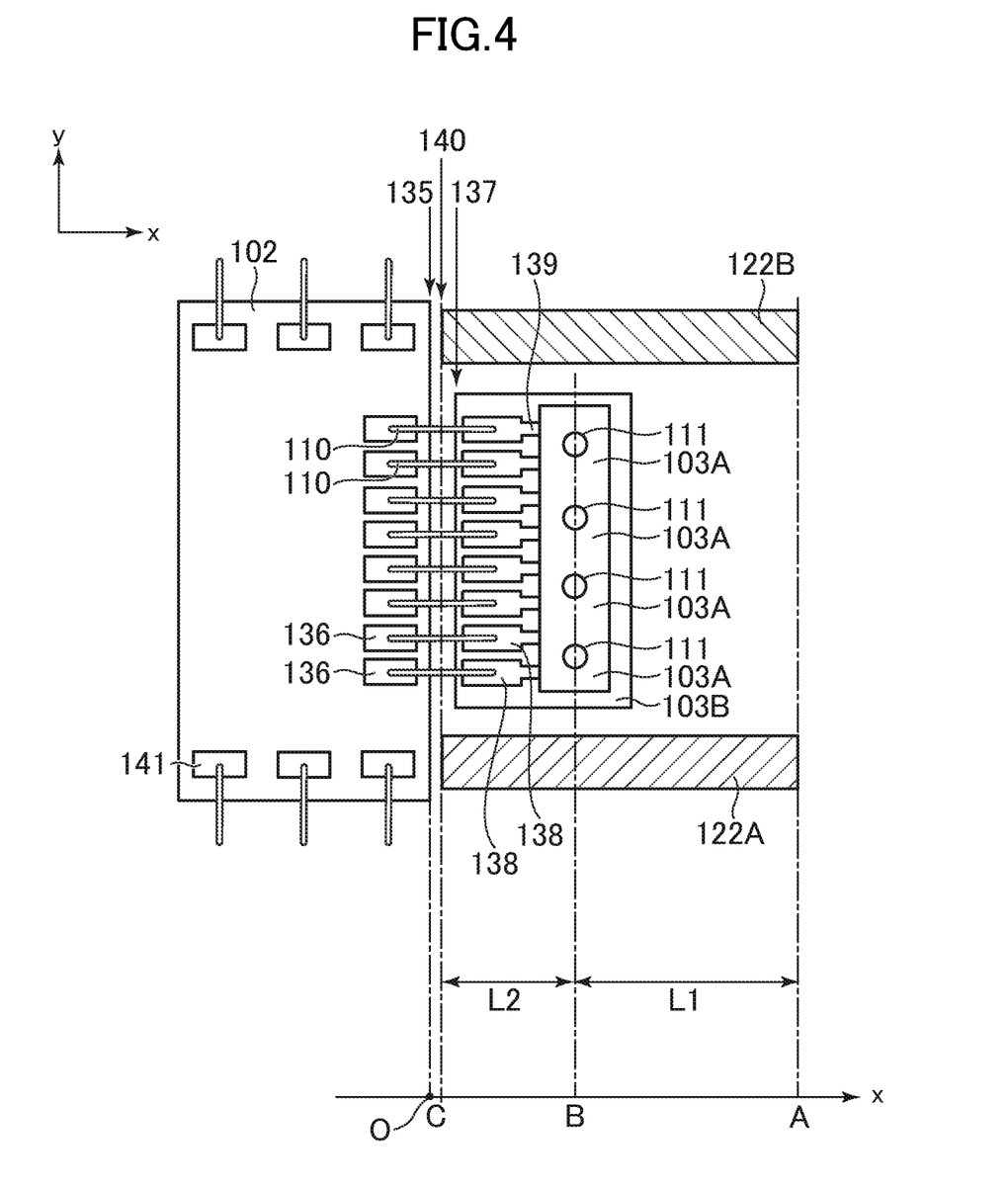
FIG. 4 is a cross-sectional view illustrating a configuration of a principal part of the optical receiver module according to the first embodiment of the present invention.

The IC 102 is provided with two or more IC terminals (here, eight IC terminals) disposed along an end part, and at the same time, has an amplification function (see FIG. 4). The IC 102 has a TIA function here, but is not limited to this configuration. The PD element 103 is disposed in front (in a +x-axis direction) of the IC 102. The PD element 103 is a light receiving element provided with two or more PD terminals (here, eight PD terminals) to be connected to the two or more IC terminals (here, the eight IC terminals) through two or more wires 110 (here, eight wires 110), respectively. The PD element 103 includes four photo diodes 103A (Photo Diode) and a sub-mount 103B, and the four photo diodes 103A are arranged along the end part of the IC 102. The photo diodes 103A are each manufactured including a semiconductor multilayer (including a light absorbing layer). The photo diodes 103A each have a light receiving window 111 through which the light enters the photo diode 103A from the outside. The light receiving window 111 is disposed above each of the photo diodes 103A, and the photo diodes 103A each convert an optical signal entering the light receiving window 111 into an electric signal. The sub-mount 103 is formed of a ceramic substrate (for example, an AlN substrate) having a surface on which electrode patterns and the two or more PD terminals (here, the eight PD terminals) are disposed. The four photo diodes 103A are disposed on an upper surface of the sub-mount 103B. The electrode patterns on the sub-mount 103B electrically connect the four photo diodes 103A and the two or more PD terminals (here, the eight PD terminals).

Figure 3:
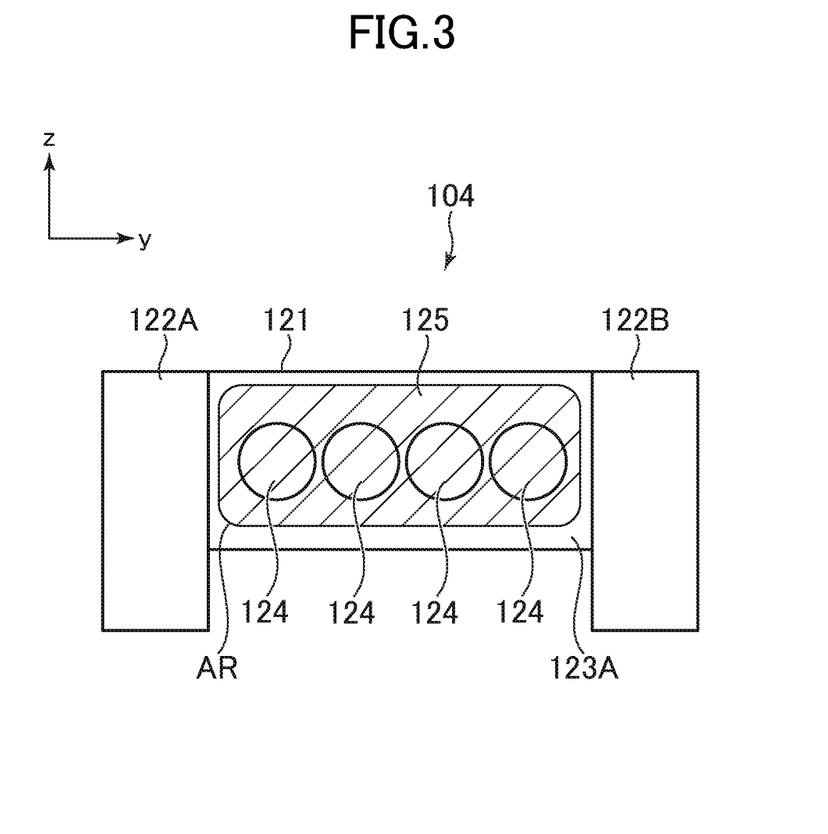
FIG. 3 is a front view of a microlens array according to the first embodiment of the present invention.

FIG. 3 is a front view of the microlens array 104 according to the first embodiment. FIG. 3 illustrates a front surface (a y-z plane) of the microlens array 104 viewed from the front (the +x-axis direction) thereof. Here, a y-axis direction is a direction perpendicular to the x-axis direction in the surface of the metal substrate 101. The microlens array 104 is a first optical component provided with a lens main body section 121 and two bridge footing sections 122A and 122B. The two bridge footing sections 122A and 122B rise upward (toward a +z-axis direction) from the surface of the metal substrate 101, and the two bridge footing sections 122A and 122B support the lens main body section 121, and at the same time, fix the lens main body section 121 to a position above the surface of the metal substrate 101. The lens main body section 121 is supported by the two bridge footing sections 122A and 122B disposed on the both sides of the lens main body section 121, and at the same time, the lens main body section 121 is located between upper portions of the two bridge footing sections 122A and 122B. The microlens array 104 is disposed on the surface of the metal substrate 101 and in front of the IC 102 so as to cover the PD element 103. The PD element 103 is disposed below the lens main body section 121, and in a planar view, the lens main body section 121 and the PD element 103 overlap each other.

Figure 5:
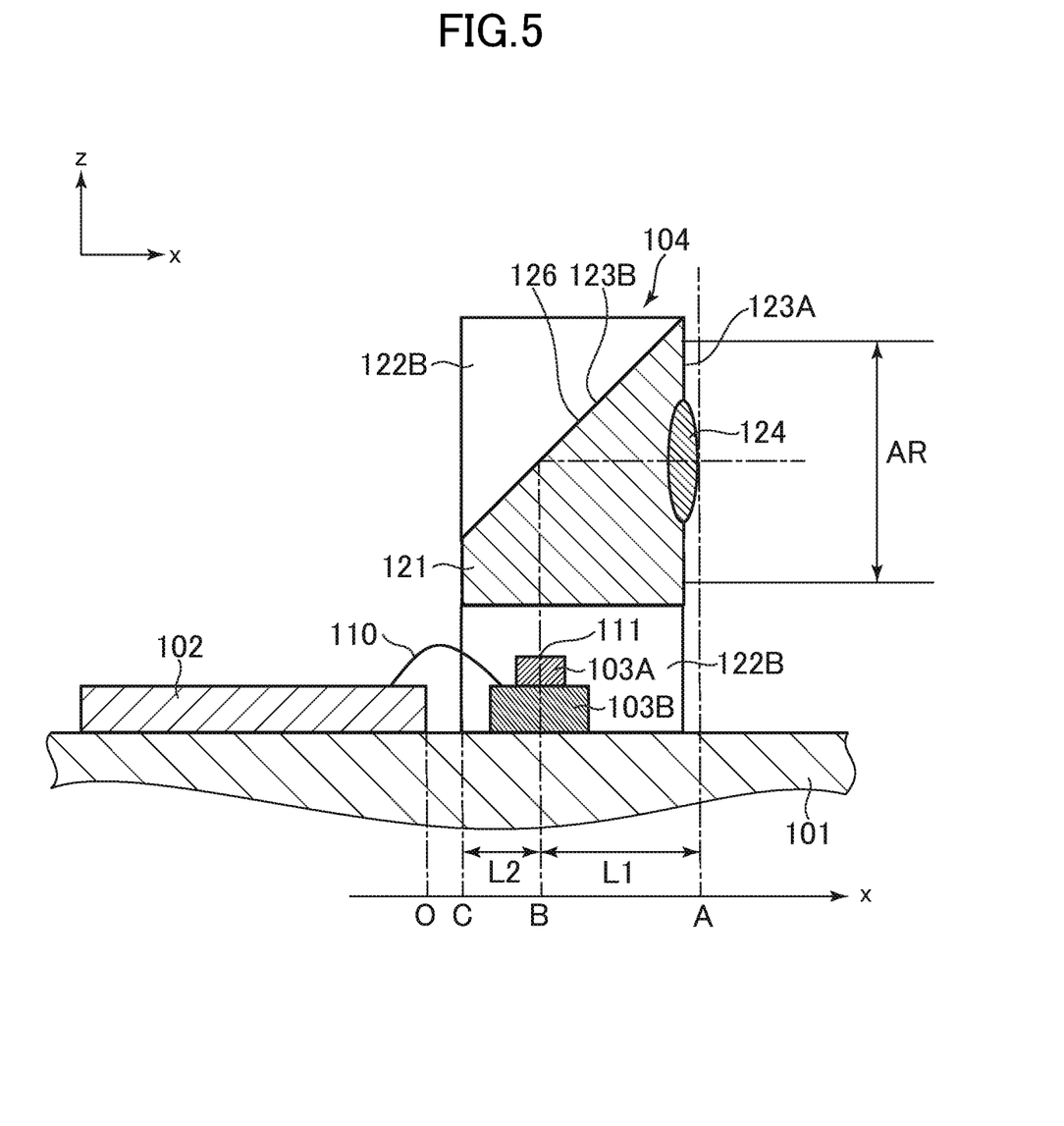
FIG. 5 is a cross-sectional view illustrating a configuration of a principal part of the optical receiver module according to the first embodiment of the present invention.

The lens main body section 121 of the microlens array 104 according to the first embodiment has a rising surface 123A disposed on the front side and an upper surface 123B disposed above the lens main body section 121 (see FIG. 5). On the rising surface 123A of the lens main body section 121, there are disposed four lenses 124 arranged in a lateral direction in FIG. 3. The lenses 124 are each a convex lens for collecting light entering the lens 124 from the front. An antireflection film 125 is disposed covering the four lenses 124, and an area where the antireflection film 125 is disposed on the rising surface 123A is shown in FIG. 3 as an antireflection film formation area AR.

As shown in FIG. 2, a mirror 126 is disposed on an upper surface of the lens main body section 121, and the mirror 126 reflects the light collected by each of the lenses 124 to be converged on the light receiving window 111 of the corresponding photo diode 103A. It is desirable for the focus of the light converged by each of the lenses 124 to be located on the light receiving window 111 of the corresponding photo diode 103A, or an absorbing layer inside the photo diode 103A, but it is sufficient for the focus position to be selected as needed. The microlens array 104 is formed by press molding of glass, or injection molding using plastic resin or the like. In the case of forming the microlens array 104 by molding, the mirror 126 is formed in the upper surface of the lens main body section 121, but is not necessarily required to be formed on the upper surface, and it is possible to bury a reflecting surface of the mirror 126 with another member.

The connecting section 107 includes the collimating lens 107A, and at the same time, an optical fiber 130 is mounted on the connecting section 107. It is also possible for the connecting section 107 to have such a receptacle shape that an external optical fiber is inserted. The light entering the inside of the box-type housing 106 of the optical receiver module 100 from the optical fiber 130 is converted by the collimating lens 107A into parallel light, and then enters the optical demultiplexing circuit 105. The light (the optical signal) entering the optical receiver module 100 from the optical fiber 130 is a multiple-wavelength transmission signal. The optical demultiplexing circuit 105 includes a demultiplexer, a mirror and an optical component such as an optical filter. The light (the multiple-wavelength transmission signal) entering the optical demultiplexing circuit 105 is demultiplexed into four channels of light (single wavelength signals), and then each light (parallel light) enters the corresponding lens 124 of the microlens array 104.

FIG. 4 is a cross-sectional view illustrating a configuration of a principal part of the optical receiver module 100 according to the first embodiment. FIG. 4 illustrates a cross-section along the line IV-IV shown in FIG. 2. The cross-section shown in FIG. 4 is parallel to the surface of the metal substrate 101, and corresponds to the x-y plane. FIG. 5 is a cross-sectional view illustrating a configuration of a principal part of the optical receiver module 100 according to the first embodiment. FIG. 5 illustrates a cross-section along the line V-V shown in FIG. 4, and corresponds to the x-z plane. As shown in FIG. 4, the IC 102 having the amplification function has a rectangular shape, and an end part 135 (an outer edge on the PD element 103 side) on the PD element 103 side of the IC 102 is a side (a right side) extending in the y-axis direction out of the rectangular shape. The IC 102 includes eight IC terminals 136 (pad electrodes) disposed along the end part 135.

The PD element 103 is disposed in front (in the +x-axis direction) of the IC 102. As shown in FIG. 4, the sub-mount 103B of the PD element 103 has a rectangular shape, and an end part 137 (an outer edge on the IC 102 side) on the IC 102 side of the sub-mount 103B is a side (a left side) extending in the y-axis direction out of the rectangular shape. On the upper surface of the sub-mount 103B, there are disposed eight PD terminals 138 (pad electrodes) and electrode patterns 139. Each of the IC terminals 136 of the IC 102 is electrically connected to the corresponding PD terminal 138 of the PD element 103 through the wire 110. The IC 102 is additionally provided with a plurality of terminals 141. The plurality of terminals 141 is electrically connected to an interconnection board (not shown) such as flexible printed circuits through the wires, and electrical power for driving the IC 102 and signals for controlling are input to the plurality of terminals 141, respectively.

A principal feature of the optical receiver module 100 according to the first embodiment is that a distance L1 between a position A and a position B is longer than a distance L2 between the position B and a position C in a planar view, wherein the position A is a position of the lens 124 with respect to the end part 135 of the IC 102, the position B is a position of the light receiving window 111 of the PD element 103 with respect to the end part 135 of the IC 102, and the position C is a position of an end part 140 on the IC 102 side of the two bridge footing sections 122A and 122B of the microlens array 104 with respect to the end part 135 of the IC 102. Here, the position with respect to the end part 135 of the IC 102 denotes a coordinate in the +x-axis direction with respect to the end part 135 defining the end part 135 as the origin. Here, the +x-axis direction coincides with the direction of getting away from the IC 102 perpendicularly to the end part 135.

As shown in FIG. 5, the position A of the lens 124 denotes the position of the surface (the lens surface) penetrating the optical axis 141 (the center) of the lens 124, and in the case in which the lens 124 is formed so as to protrude from a plane of the rising surface 123A of the lens main body section 121, the position A of the lens 124 is located on the outer side (in the +x-axis direction) with respect to the end part 135 of the IC 102 from the position of the rising surface 123A. However, since the protrusion of the surface of the lens 124 is minute, the position of the lens 124 practically coincides with the position of the plane of the rising surface 123A. Here, the four lenses 124 are arranged along the extending direction (the y-axis direction) of the end part 135 of the IC 102, and the positions A of the four lenses 124 coincide with each other.

The position B of the light receiving window 111 denotes the position of the center of the light receiving window 111 of the PD element 103. The light receiving window 111 according to the first embodiment has a circular shape, and the center denotes the center of the circular shape. The definition of the position B of the light receiving window 111 depends on the shape of the light receiving window 111, but the position B of the light receiving window 111 is defined as a midpoint between an end on the IC 102 side and an end on the opposite side thereto of the light receiving window 111 in the case of projecting the light receiving window 111 on the x axis. Here, the four light receiving windows 111 are arranged along the extending direction (the y-axis direction) of the end part 135 of the IC 102, and the positions B of the four light receiving windows 111 coincide with each other.

The position C of the end part 140 of the two bridge footing sections 122A and 122B denotes a nearer one to the end part 135 of the IC 102 of the positions of the ends on the IC 102 side of the two bridge footing sections 122A and 122B, respectively. In general, the size of the IC 102 having the amplification function is larger in width (the y-axis direction) than the size of other components (the PD element 103, the optical demultiplexing circuit 105 and so on), and is a principal factor for determining the width (the y-axis direction) of the optical receiver module 100. In the case of providing the microlens array 104 with a shape of covering the whole of the IC 102, namely in the case of disposing the microlens array 104 so that the bridge footing sections 122A and 122B pinch the both ends (the both ends along the y direction) of the IC 102, it becomes possible to approximate the IC 102 and the PD element 103 to each other. However, an increase in width of the optical receiver module 100 is incurred as a result, which becomes an obstacle to reduction in size of the optical module 2. Therefore, the microlens array 104 is disposed in front of (on the right side shown in FIG. 4) of the IC 102, the two bridge footing sections 122A and 122B of the microlens array 104 are both located on the front side of the end part 135 of the IC 102, and the position C of the end part 140 of the two bridge footing sections 122A and 122B is located on the front side (the +x-axis direction) of the end part 135 of the IC 102. Here, the positions (the coordinates in the x-axis direction) of the ends of the two bridge footing sections 122A and 122B coincide with each other. By adopting this arrangement, it becomes possible to dispose the microlens array 104 while preventing the width of the optical receiver module from increasing, but it results in increase in the distance between the IC 102 and the PD element 103. Therefore, in the present invention, the problem is solved by making the distance L2 larger than the distance L1.

As shown in FIG. 5, in the cross-section by the x-z plane of the lens main body section 121, the rising surface 123A, the upper surface 123B (the reflecting surface of the mirror 126) and the bottom surface form a roughly isosceles right triangle, but accurately form a trapezoid cut by a back surface on the back side of the upper surface 123B. The upper surface 123B crosses the x-y plane at an angle of 45°. Thus, the light entering the lens 124 in the −x-axis direction is reflected by the mirror 126 of the upper surface 123B while being collected by the lens 124, then is changed in the proceeding direction to a −z-axis direction, and then enters the light receiving window 111 of the PD element 103 in the −z-axis direction. The angle at which the upper surface 123B crosses the x-y plane is not limited to 45°, but desirably set within a range of 45°±5°. Further, since the cross-section of the lens main body section 121 has such a shape, the PD element 103 is successfully disposed so that the distance L2 becomes shorter than the distance L1 while sufficiently ensuring the antireflection film formation area AR of the antireflection film 125 disposed so as to cover the lens 124. Thus, it is possible to dispose the PD terminals 138 of the PD element 103 close to the IC terminals 136 of the IC 102, and the wiring length of the wires 110 for connecting the PD terminals 138 and the IC terminals 136 to each other is successfully shortened. By shortening the wiring length of the wires 110, it is possible to prevent the inductance from increasing, and thus, an influence on the high frequency characteristic due to the wiring length of the wires 110 is successfully suppressed.

In the optical receiver module 100 according to the first embodiment, if the distance L2 is only a little bit shorter than the distance L1, it is possible to dispose the PD element 103 more posteriorly, and therefore, the advantage of the present invention is obtained. Further, in view of the size of the optical transmitter/receiver module for a data center higher than 100 Gbit/s, it is desirable to fit the sum L1+L2 (=L) of the distance L1 and the distance L2 within a range of 1.0 mm. Further, in order to make the optical receiver module 100 perform a high-speed operation, it is desirable for the lower limit of the distance L2 to become as follows. It is desirable for a pencil entering the light receiving window 111 of the photo diode 103A to have a small focal spot size in the light absorbing layer of the photo diode 103A, and in that point of view, it is desirable for the cross-section of the pencil entering the light receiving window 111 to be collected by the lens 124 so as to be sufficiently small, and the smaller the size of the light receiving window 111 (the light receiving section) is, the more desirable. However, in view of the fact that the cross-section of the light beam is a finite size, an optical axis adjustment error and so on in addition to the distance between the light receiving window 111 and the light absorbing layer, it is desirable for the radius of the light receiving window 111 to ensure a value no smaller than 0.015 mm. Further, in a planar view, the shorter the distance from the end part 137 of the sub-mount 103B to the end (a part the closest to the end part 137 of the edge of the light receiving window 111: the left end shown in FIG. 4) of the light receiving window 111 of the photo diode 103A is, the more desirable. However, in the viewpoint of ensuring the area for disposing the PD terminal 138 and the photo diode 103A on the upper surface of the sub-mount 103B, it is desirable to ensure a value no smaller than 0.05 mm as such a distance. Therefore, the lower limit of the distance L2 is in the case in which the end part 137 of the sub-mount 103B coincides with the position C of the end part 140 of the two bridge footing sections 122A and 122B, and is 0.065 mm. In this case, the distance L1 is 1−0.065=0.935 mm, and the lower limit of L2/L1 is 0.070. Therefore, the range of L2/L1 for realizing the high-speed operation and reduction in size is no smaller than 0.07 and lower than 1.

Similarly, in order to make the optical receiver module 100 perform a high-speed operation, it is more desirable for the higher limit of the distance L2 to become as follows. It is desirable for the distance between the end part 135 of the IC 102 and the end part 140 (the position C) of the two bridge footing sections 122A and 122B to be ensured as much as a value no smaller than 0.1 mm in view of the manufacturing accuracy. In the case of increasing the distance L2, the wires 110 elongate, and the high frequency characteristic deteriorates as a result. In view of the high frequency characteristic, it is desirable for the distance between the end part 135 of the IC 102 and the end part 137 of the sub-mount 103B to be no more than 0.45 mm. In the case in which the end part 137 of the sub-mount 103B coincides with the position C of the end part 140 of the two bridge footing sections 122A and 122B, it is desirable for the distance from the end part 140 of the two bridge footing sections 122A and 122B to the end part 137 of the sub-mount 103B to be no more than 0.45−0.1=0.35 mm, and further, it is desirable for the distance from the end part 137 of the sub-mount 103B to the center (the position B) of the light receiving window 111 of the photo diode 103A to be 0.015+0.05=0.065 mm. In this case, the distance L2 is 0.35+0.065=0.415 mm, and the distance L1 is 1−0.415=0.585 mm. Therefore, it is further desirable for L2/L1 to be no higher than 0.71.

In view of a further improvement of the high frequency characteristic, it is more desirable for the distance between the end part 135 of the IC 102 and the end part 137 of the sub-mount 103B to be no more than 0.35 mm. In this case, the distance L2 is (0.35−0.1)+0.065=0.315 mm, and the distance L1 is 1−0.315=0.685 mm. Therefore, it is further desirable for L2/L1 to be no higher than 0.46.

Second Embodiment

Figure 6:
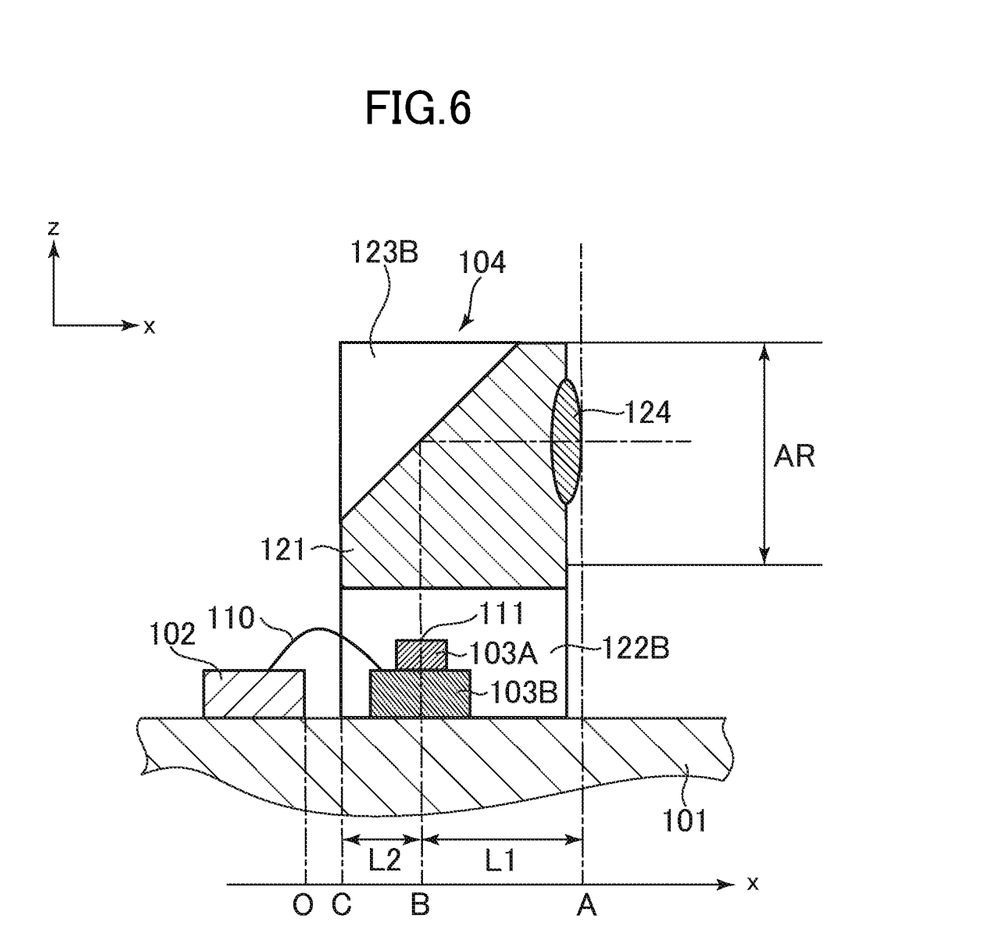
FIG. 6 is a cross-sectional view illustrating a configuration of a principal part of an optical receiver module according to a second embodiment of the present invention.

FIG. 6 is a cross-sectional view illustrating a configuration of a principal part of an optical receiver module 100 according to a second embodiment of the present invention. FIG. 6 corresponds to the cross-section of the principal part of the optical receiver module 100 according to the first embodiment shown in FIG. 5, and the configuration of the optical receiver module 100 according to the second embodiment is the same as in the first embodiment except the fact that the structure of the lens main body section 121 is different.

As shown in FIG. 6, the lens main body section 121 according to the second embodiment has a shape obtained by cutting out a part of a portion located above the lens 124 from the lens main body section 121 according to the first embodiment shown in FIG. 5. Here, the upper surface 123B of the lens main body section 121 has a flat surface generated by cutting, and a tilted surface of the mirror 126. In the case in which the antireflection film formation area AR for the antireflection film 125 can be ensured, and there is no problem in the formation process for forming the lenses 124, further reduction in size is achieved compared to the first embodiment while obtaining substantially the same advantages as in the first embodiment.

Third Embodiment

Figure 7:
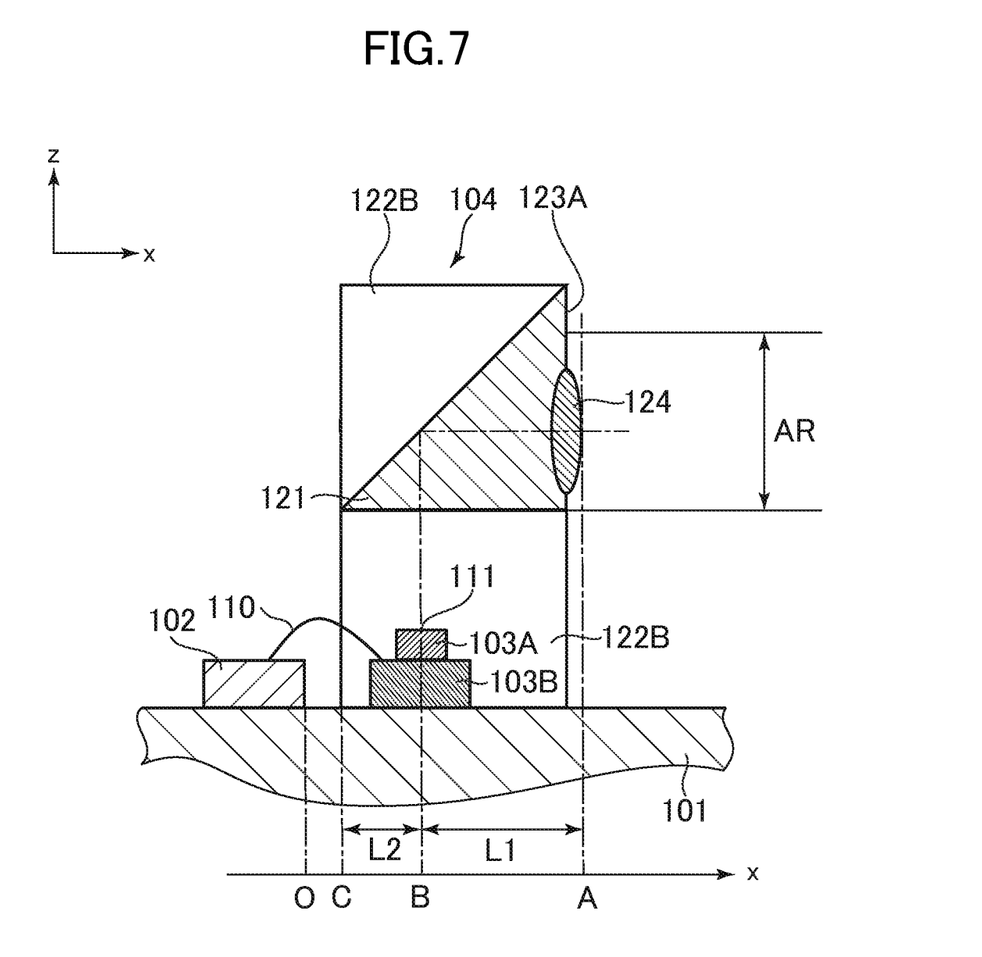
FIG. 7 is a cross-sectional view illustrating a configuration of a principal part of an optical receiver module according to a third embodiment of the present invention.

FIG. 7 is a cross-sectional view illustrating a configuration of a principal part of an optical receiver module 100 according to a third embodiment of the present invention. FIG. 7 corresponds to the cross-section of the principal part of the optical receiver module 100 according to the first embodiment shown in FIG. 5, and the configuration of the optical receiver module 100 according to the third embodiment is the same as in the first and second embodiments except the fact that the structure of the lens main body section 121 is different.

As shown in FIG. 7, the lens main body section 121 according to the third embodiment has a shape obtained by cutting out a part of a portion located below the lens 124 from the lens main body section 121 according to the first embodiment shown in FIG. 5, and the cross-sectional shape, namely the shape of the cross-section of the lens main body section 121, is an isosceles right triangle. In the case in which the antireflection film formation area AR for the antireflection film 125 can be ensured, and there is no problem in the formation process for forming the lenses 124, further reduction in size is achieved compared to the first embodiment while obtaining substantially the same advantages as in the first embodiment.

Fourth Embodiment

Figure 8:
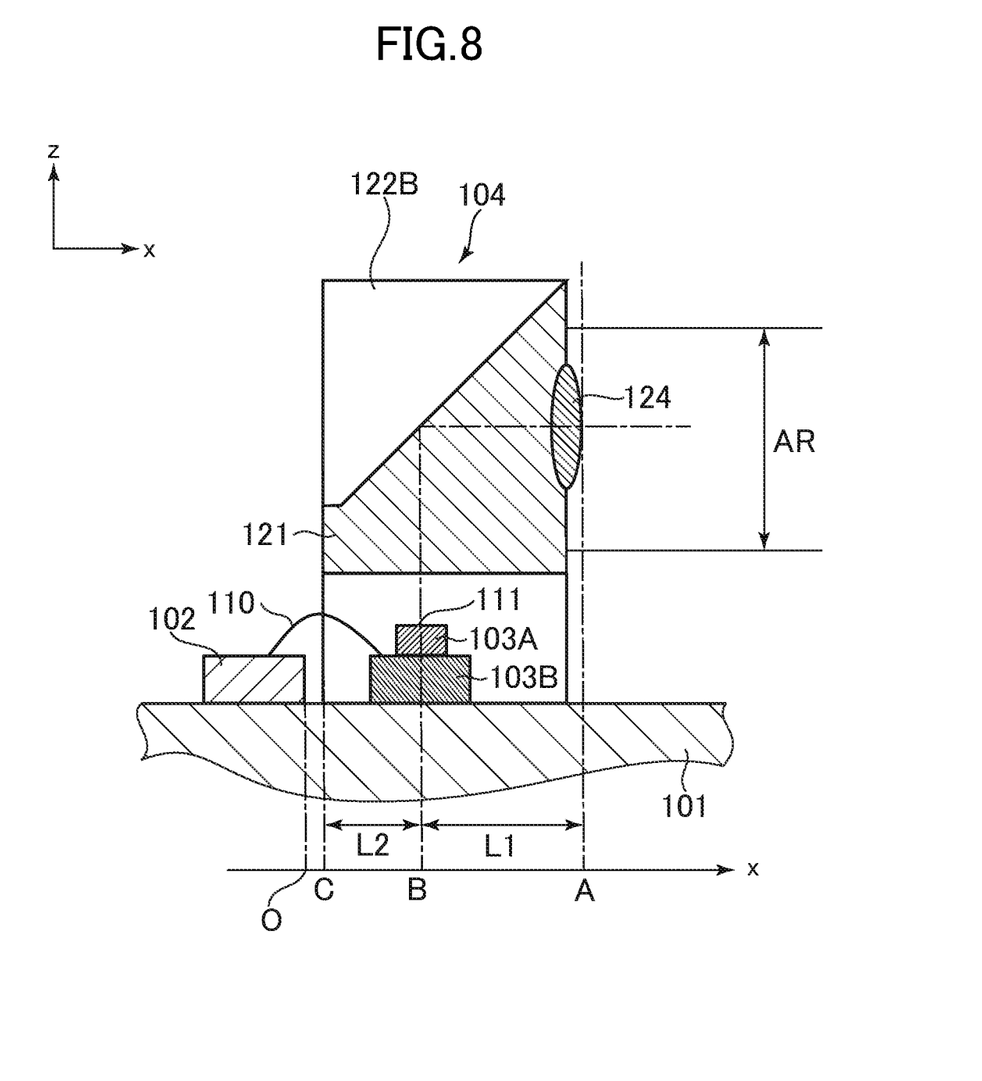
FIG. 8 is a cross-sectional view illustrating a configuration of a principal part of an optical receiver module according to a fourth embodiment of the present invention.

FIG. 8 is a cross-sectional view illustrating a configuration of a principal part of an optical receiver module 100 according to a fourth embodiment of the present invention. FIG. 8 corresponds to the cross-section of the principal part of the optical receiver module 100 according to the first embodiment shown in FIG. 5, and the configuration of the optical receiver module 100 according to the fourth embodiment is the same as in the first through third embodiments except the fact that the structure of the lens main body section 121 is different.

As shown in FIG. 8, the cross-section of the lens main body section 121 according to the fourth embodiment has a shape obtained by adding a rectangular shape extending backward (leftward in FIG. 8) to the cross-section of the lens main body section 121 according to the first embodiment shown in FIG. 5. Here, the upper surface 123B of the lens main body section 121 has the tilted surface of the mirror 126, and a flat surface as an upper side (an upper surface) of the rectangular shape thus added. The fourth embodiment is the most suitable for the case in which it is necessary to ensure a space in the posterior area of the optical axis of the incident light due to the shape of the PD element 103 or the like.

Hereinabove, the optical receiver module, the optical module, the optical transmission equipment and the optical transmission system according to the embodiments of the present invention are described. The present invention is not limited to the embodiments described above, but can variously be modified, and the present invention can widely be implemented. The constituents explained in the embodiment described above can be replaced with substantially the same constituents, constituents exerting the same functions and advantages, or constituents capable of achieving the same object.

In the case of manufacturing a lens by injection molding using plastic resin, there is a risk for causing bubbles or patches depending on the speed at which the material is injected into the metal mold. In order to prevent such a risk, it is desirable for the shape variation to be gentler, and it is desirable for the width (the length in the x-axis direction) of the bridge footing sections 122A and 122B to be ensured more sufficiently. In general, in the case of ensuring the width of the bridge footing sections 122A and 122B, the distance between the IC terminals 136 and the PD terminals 138 increases, and the wiring length of the wires 110 also elongates. In order to avoid the above, it is also possible to achieve the resolution by making the length in the y-axis direction of the lens main body section 121 longer than the length (the length in the y-axis direction) of the end part 135 of the IC 102 to form a structure of sandwiching the IC 102 with the bridge footing sections 122A and 122B. However, in this case, the size of the microlens array 104 increases to become a factor for hindering the reduction in size. Further, it is conceivable to adopt a structure in which the width (the length in the x-axis direction) of the lens main body section 121 is made longer than the width (the length in the x-axis direction) of the bridge footing sections 122A and 122B, and thus, the lens main body section 121 projects backward from the bridge footing sections 122A and 122B like a canopy top. However, from the viewpoint of sufficiently ensuring the width of the bridge footing sections 122A and 122B, it is desirable for the width of the bridge footing sections 122A and 122B to coincide with the width of the lens main body 121.

It is assumed in the embodiments that the light entering the lens 124 from the optical demultiplexing circuit 105 is the parallel light, but this is not a limitation. It is possible that the optical demultiplexing circuit 105 is further provided with a collecting lens, and thus, the light entering the lens 124 is converging light, or the light is further converged by the lens 124 to make the converging light appropriately enter the PD element 103.

It is assumed in the embodiments described above that the IC 102 has a rectangular shape, but this is not a limitation. In other words, it is desirable for the end part 135 of the IC 102 to have a linear shape, and to be opposed to the end part 137 of the sub-mount 103B of the PD element 103, but this is not a limitation. Even in the case in which the end part 135 does not have the linear shape, it is sufficient to define a place which is adjacent to the bridge footing sections 122A and 122B of the microlens array 104 along the x-axis direction as the end part 135.

In the embodiments described above, there is described the case of the four-channel microlens array 104, but this is not a limitation, and it is possible to adopt the case in which the number of channels is different, or the case of a single channel. Further, in the case in which the distance L2 is shorter than the distance L1 in at least any one of the four light receiving windows 111, the advantage of preventing the increase in inductance due to shortening the wiring length of the wires 110 is exerted regarding such a part.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical receiver module comprising:
a substrate;
an IC disposed on a surface of the substrate, provided with two or more IC terminals disposed along an end part, and having an amplification function;
a light receiving element disposed on the surface of the substrate and in front of the IC, provided with two or more PD terminals respectively connected to the two or more IC terminals through two or more wires, and having a light receiving window through which light externally enters the light receiving element; and
a first optical component disposed on the surface of the substrate and in front of the IC so as to cover the light receiving element, and provided with two bridge footing sections rising upward from the surface of the substrate, and a lens main body section supported by the two bridge footing sections, and located between upper portions of the two bridge footing sections, wherein
the lens main body section has a rising surface disposed in front, and is provided with a lens disposed on the rising surface and adapted to converge light entering the lens, and a mirror adapted to reflect the light converged by the lens to converge the light on the light receiving window of the light receiving element, and
a distance L1 between a position A of the lens with respect to an end part of the IC and a position B of the light receiving window of the light receiving element is longer than a distance L2 between the position B with respect to the end part of the IC and a position C of an end part on the IC side of the two bridge footing sections of the first optical component in a planar view.

2. The optical receiver module according to claim 1, wherein
a ratio of the distance L2 to the distance L1 is no lower than 0.07 and lower than 1.0.

3. An optical module comprising:
the optical receiver module according to claim 1; and
an optical transmitter module.

4. An optical transmission equipment comprising:
the optical module according to claim 3.

* * * * *